(12) United States Patent
Cabezas et al.

(10) Patent No.: US 7,873,748 B2
(45) Date of Patent: Jan. 18, 2011

(54) SYNCHRONIZATION OF LOCALLY AND REMOTELY STORED BROWSER DATA

(75) Inventors: Rafael Graniello Cabezas, Austin, TX (US); Brandon Dale Nelson, Austin, TX (US); Elizabeth Silvia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/948,539

(22) Filed: Nov. 30, 2007

(65) Prior Publication Data

US 2009/0144451 A1 Jun. 4, 2009

(51) Int. Cl.
*G06F 15/16* (2006.01)

(52) U.S. Cl. .................. 709/248; 709/205; 715/751

(58) Field of Classification Search .......... 709/203, 709/248, 205, 217
See application file for complete search history.

(56) References Cited

U.S. PATENT DOCUMENTS

| | | | |
|---|---|---|---|
| 6,253,228 B1 * | 6/2001 | Ferris et al. .................. 709/203 |
| 6,662,212 B1 * | 12/2003 | Chandhok et al. ........... 709/206 |
| 6,976,094 B1 * | 12/2005 | Dalrymple et al. ........... 709/248 |
| 7,039,679 B2 * | 5/2006 | Mendez et al. ............... 709/248 |
| 7,225,225 B2 * | 5/2007 | Kuki et al. ................... 709/205 |
| 7,263,547 B2 * | 8/2007 | Kloba et al. ................. 709/217 |
| 7,324,997 B2 * | 1/2008 | Yamada ............................. 1/1 |
| 2003/0009521 A1 * | 1/2003 | Cragun ........................ 709/205 |
| 2003/0204445 A1 | 10/2003 | Vishik et al. |
| 2006/0136498 A1 | 6/2006 | Insley |
| 2007/0112845 A1 | 5/2007 | Gilmour et al. |
| 2007/0121869 A1 | 5/2007 | Gorti et al. |
| 2007/0283049 A1 * | 12/2007 | Rakowski et al. ........... 709/246 |
| 2008/0059632 A1 * | 3/2008 | Bocking et al. ............. 709/225 |
| 2008/0301222 A1 * | 12/2008 | Schneider ................... 709/203 |

* cited by examiner

*Primary Examiner*—Salad Abdullahi
(74) *Attorney, Agent, or Firm*—Yee & Associates, P.C.; Jeffrey S. LaBaw

(57) ABSTRACT

A computer implemented method, apparatus, and computer program product for displaying information within a browser. Server browser information is stored on a web server. The server browser information includes a set of first category categories and a set of second category categories. An indication of whether a user is on a public system or a private system is received by the web server. Responsive to receiving the indication that the user is on a public system, only the set of public categories of the browser information is displayed to the user.

20 Claims, 4 Drawing Sheets

SYNCHRONIZATION OF LOCALLY AND REMOTELY STORED BROWSER DATA

BACKGROUND OF THE INVENTION

1. Field of the Invention

The present invention relates generally to a data processing system, computer implemented method, and a computer program product. More specifically, the present invention relates to a data processing system, computer implemented method, and a computer program product for synchronizing local and remote histories and bookmarks within a browser.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called Transmission Control Protocol/Internet Protocol (TCP/IP).

The Internet has revolutionized communications and commerce along with being a source for both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name system (DNS), which is a service that translates the symbolic name entered by the user into an IP address by looking up the domain name in a database.

The browser includes a user interface, which is a GUI that allows the user to interface or communicate with another browser. This interface provides for selection of various functions through menus and allows for navigation. For example, a menu may allow a user to perform various functions, such as saving a file, opening a new window, displaying a history, entering a URL, and "bookmarking" specific URLs for later viewing.

People are more and more frequently accessing online information and using multiple systems. However, because they use multiple systems it is difficult to have bookmarked bookmarks on the systems that they use. It is impractical to transfer browser history and bookmarks between systems each time you use a different system. Such a transfer requires time and effort that could just as easily be used to search in a search engine and find what the user is looking for.

SUMMARY OF THE INVENTION

The illustrative embodiments describe a computer implemented method, apparatus, and computer program product for displaying information within a browser. Server browser information is stored on a web server. The server browser information includes a set of first category categories and a set of second category categories. An indication of whether a user is on a public system or a private system is received by the web server. Responsive to receiving the indication that the user is on a public system, only the set of public categories of the browser information is displayed to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
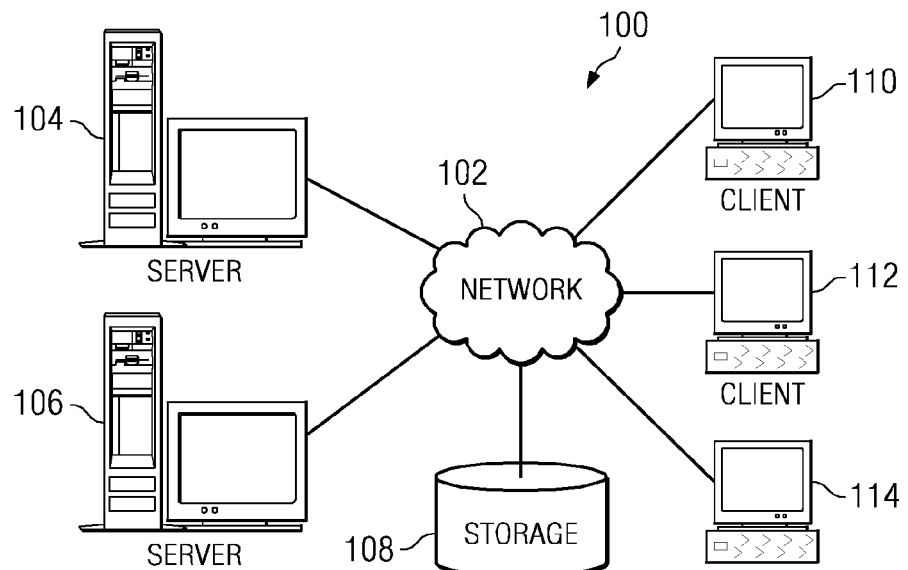
FIG. 1 is a pictorial representation of a network of data processing systems in which illustrative embodiments may be implemented.
Figure 2:
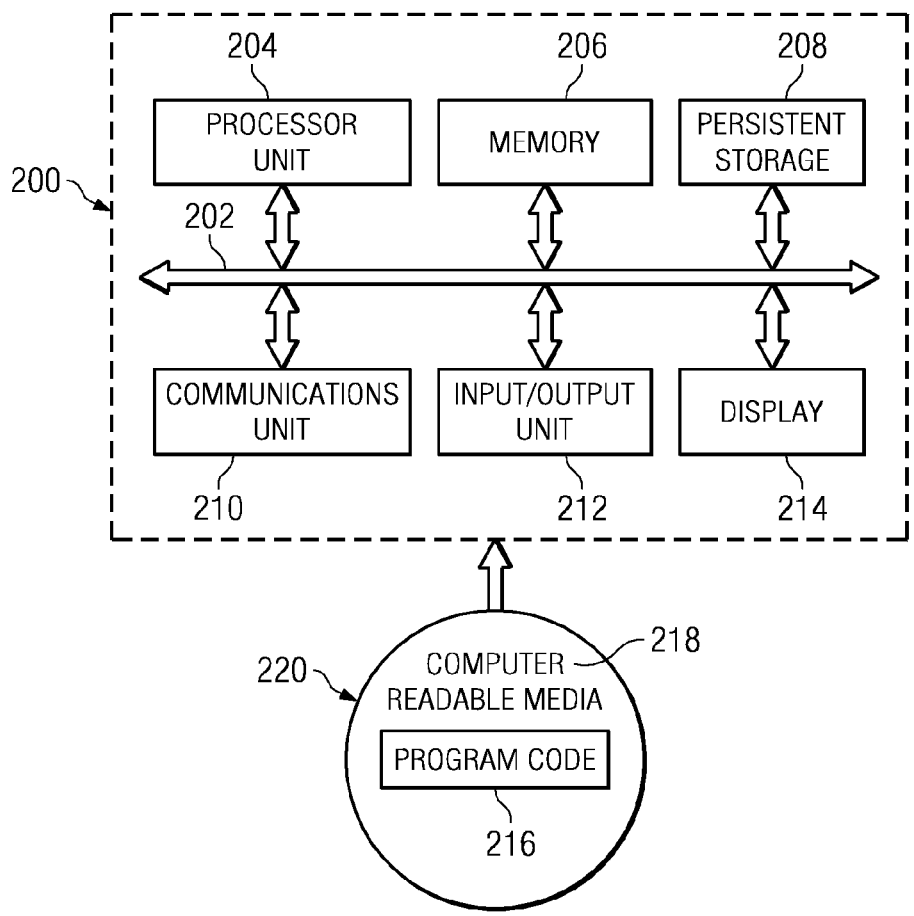
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114.

In the illustrative embodiments, a client is able to access web browser bookmarks and web browser history normally; however bookmarks are transferred from the web server, instead of being stored exclusively local. Depending on how the user sets up the current system, certain pieces of data may not be available. Various systems can then be configured to show all, or only some of these categories.

Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media x18 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
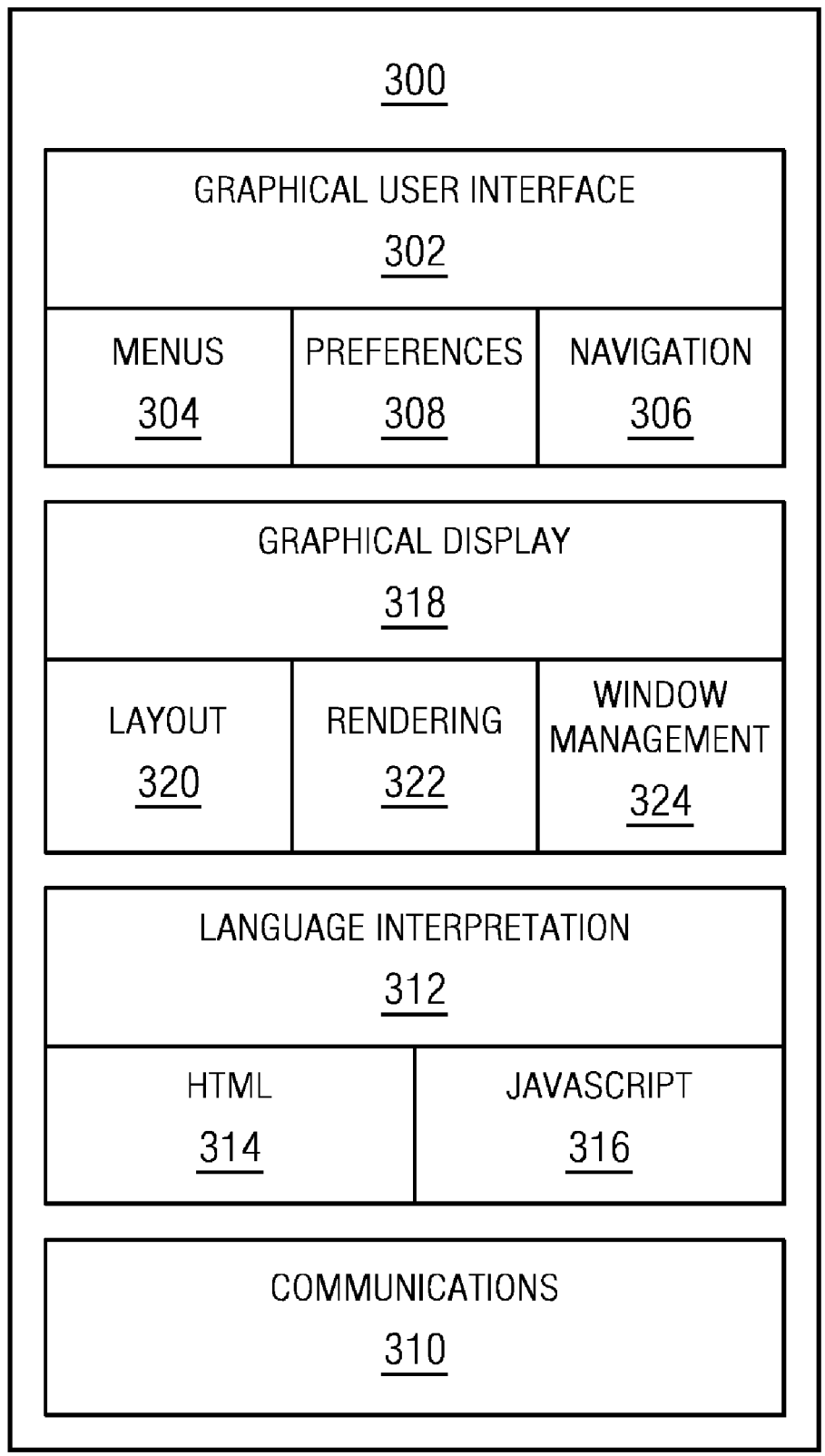
FIG. 3 is a block diagram of a browser program depicted in which illustrative embodiments may be implemented.

Turning next to FIG. 3, a block diagram of a browser program is depicted in accordance with an illustrative embodiment. A browser is an application used to navigate or view information or data in a distributed database, such as the Internet or the World Wide Web.

In this example, browser 300 includes graphical user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses hypertext transfer protocol (HTTP). Other protocols may be used depending on the implementation. Documents that are received by browser 300 are processed by language interpretation 312, which includes HTML 314 and JavaScript 316. Language interpretation 312 will process a document for presentation on graphical display 318. In particular, HTML statements are processed by HTML 314 for presentation while JavaScript statements are processed by JavaScript unit 316.

Graphical display 318 includes layout 320, rendering 322, and window management 324. These units are involved in presenting web pages to a user based on results from language interpretation 312.

Browser 300 is presented as an example of a browser program in which an illustrative embodiment may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

The illustrative embodiments herein describe a computer implemented method, apparatus, and computer program product for allowing a user to seamlessly store bookmarks and browser history to a web server for common use at the various systems from which they access online. Initial setup of the software allows the user to choose what categories they want to store to the web server, including browser history and bookmarks. The initial setup also allows the user to link an online profile to the system they are logged into. The initial setup further allows the user to define and choose various categories of bookmarks and browsing history to display on the current system. Various categories, such as public history, public bookmarks, private history, and private bookmarks, could be implemented. User modifiable defaults, such as auto logging to access the information in the online user profile, may also be provided. A local copy of designated categories may be synchronized to the current system and stored locally for instances when the online service is unavailable.

With different illustrative embodiments, the user is able to access bookmarks and history normally; except that bookmarks are transferred from the web server, instead of being stored exclusively local. Depending on how the user setup the current system, certain pieces of data may not be available. Various systems can then be configured to show all of, or only some of these categories. For example, a user has two categories for bookmarks, a public and a private. When accessing the user profile from a particular system, only those links from the designated categories on that system would be displayed in the user's list. The undesignated categories remain hidden when viewed from the particular system. However, these undesignated categories would still be available to the user at a different system, if the user chose to designate those categories for display on that different system.

The illustrative embodiments can be implemented into a browser when the web browser has no native support, such as through a web browser plug-in. The plug-in could be integrated into any future release of compatible web browsers. The plug-in could be configured when it is installed.

The illustrative embodiments also provide a new revenue model for the service providers of users choosing to utilize the illustrative embodiments. Because server space is often not free, it may be required that the users pay a fee to use an advertisement-supported server.

The illustrative embodiments could be widened to include other online profiles that may be useful to multiple system users. These may include, but are not limited to, the operating system configurations, productivity software settings, shortcut keys, and accessibility options.

Figure 4:
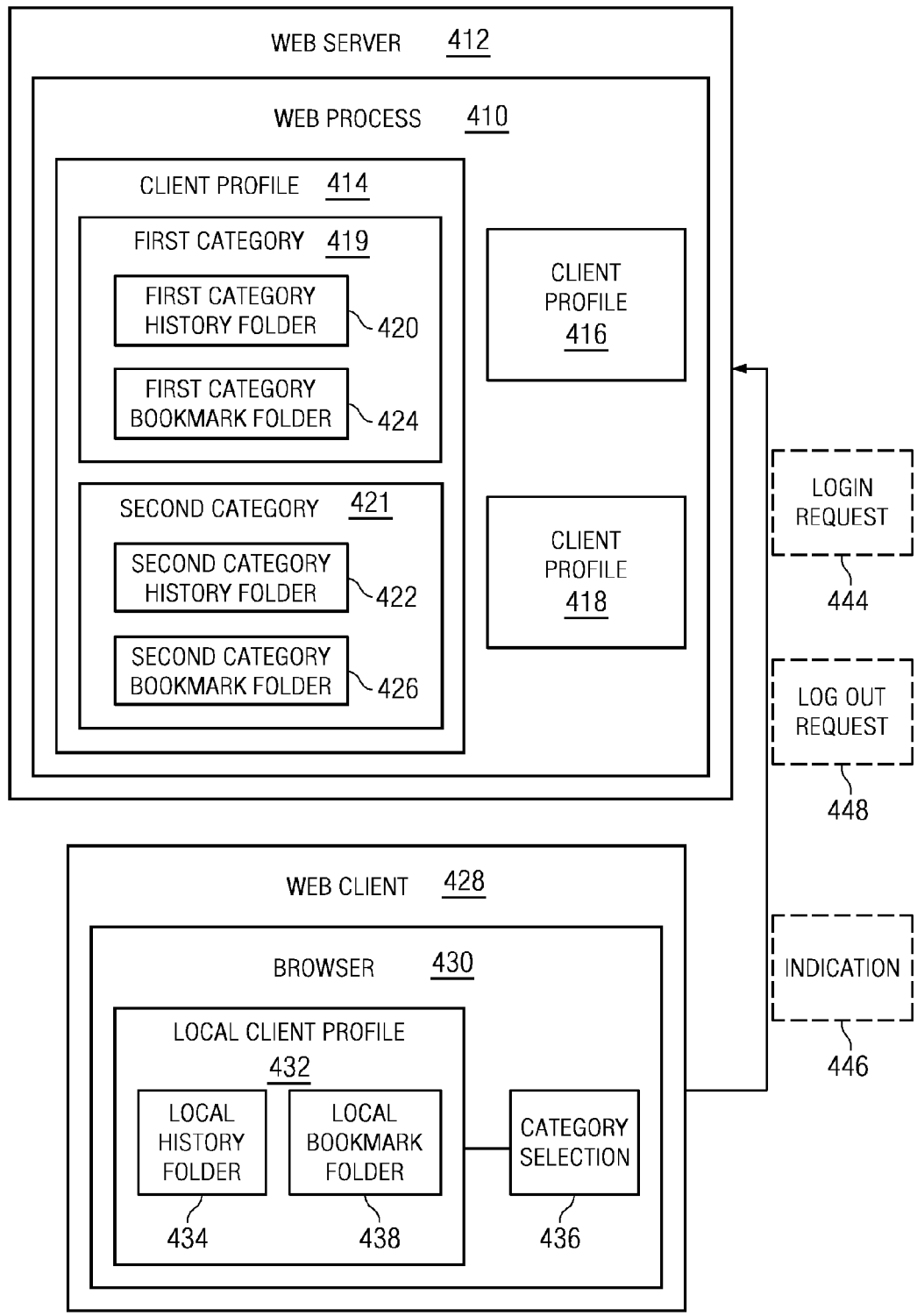
FIG. 4 is a diagram illustrating a browser synchronization system in which illustrative embodiments may be implemented.

Turning now to FIG. 4, a diagram illustrating a browser synchronization system is depicted in which illustrative embodiments may be implemented. Web process 410 executes on web server 412. Web process 410 is a software process providing web services to clients, such as clients 110, 112, and 114 of FIG. 1. Web server 412 is a server such as server 104 and 106 of FIG. 1.

Web process 410 contains client profiles 414, 416, and 418. Each of client profiles 414, 416, and 418 are associated with a web client. Client profiles 414, 416, and 418 store server browser information. The server browser information is browsing history and bookmarks recorded from the web clients, such as client 110, client 112, and client 114 in FIG. 1. Client profiles 414, 416, and 418 may be organized into various categories or folders.

In one illustrative embodiment, client profile 414 is provided with first category 419 and second category 421. First category 419 is provided with first category history folder 420, and first category bookmark folder 424. Second category 421 is provided with second category history folder 422, and second category bookmark folder 426.

Web client 428 runs browser 430. Browser 430 is to navigate or view information or data in a distributed database, such as the Internet or the World Wide Web. Browser 430 can be browser 300 of FIG. 3. Browser 430 may be a commercially available browser, such as, for example, Internet Explorer® available from Microsoft Corp., Firefox® available from Mozilla, Inc, or Navigator® available from Netscape, Inc. Browser 430 may be a proprietary browser implemented in a private network. In one illustrative embodiment, browser 430 is implemented as a plug-in which interfaces with, or embedded into a commercially available browser, allowing web client 428 to access the various history and bookmarks folders stored within the corresponding client profile 414.

Similar to web process 410, browser 430 contains local client profile 432 for storing browsing history and bookmarks recorded from the web clients. Local client profile 432 may similarly be organized into various local categories or folders, similar to first category 419 and second category 421, with which the client has designated that web client 428 should synchronize. In one illustrative embodiment, the various folders of local client profile 432 include, for example, a local history folder 434, and a local bookmark folder 438.

Local client profile 432 has an associated category selection 436. Category selection 436 is a data structure containing user designations of which first category 419 and second category 421 should be synchronized to local client profile 432.

Web client 428 accesses web server 412 utilizing browser 430. When web client 428 is authenticated, that is when web server 412 identifies that web client 428 has an account registered with the web service provider of web server 412, local client profile 432 of browser 430 is synchronized with client profile 414. Web client 428 may be authenticated by receiving a login request 444, including a login name and login password. Web client 428 also receives indication 446 of category selection 436 which the client has designated to synchronize with local client profile 432.

Indication 446 identifies to the web process 410 of first category 419 and second category 421 that a user has designated to synchronize with local client profile 432. Thus, a designated category is a category that should be synchronized with local client profile 432. In one illustrative example, if the user has designated that both first category 419 and second category 421 should be synchronized with local client profile 432, all local bookmarks and history folders are synchronized with all of the server bookmarks and history folders. First category history folder 420 is synchronized with local history folder 434. Second category history folder 422 is synchronized with local history folder 434. First category bookmark folder 424 is synchronized with local bookmark folder 438. Second category bookmark folder 426 is synchronized with local bookmark folder 438.

During the synchronization process, bookmarks that may have been added to the local bookmarks are synchronized with the server bookmarks. Likewise, bookmarks that are stored in the server bookmarks, which may have been added while the client was accessing the web server from a different data processing system, are synchronized with the local bookmarks on the currently used data processing system. Both the "public" and the "private" bookmarks are synchronized.

Furthermore, if the user has designated that both first category 419 and second category 421 should be synchronized with local client profile 432, all local history folders are synchronized with all of the server history folders. Items that are contained within the first category history folder 420, but are not contained within local history folder 434 are copied from the first category history folder 420 to the local history folder 434. Similarly, items that are contained within the second category history folder 422 but are not contained within local history folder 434 are copied from the second category history folder 422 to the local history folder 434. History items contained within the local history folder 434 but which are not contained within first category history folder 420 are copied from the local history folder 434 to the first category history folder 420 and the second category history folder 422.

In another illustrative example, the user has designated that only first category 419, and not second category 421, should be synchronized with local client profile 432. Local bookmarks and history folders are synchronized with only those categories which the user has designated. First category history folder 420 is synchronized with local history folder 434. However, second category history folder 422 is not synchronized with local history folder 434. First category bookmark folder 424 is synchronized with local bookmark folder 438. However, second category bookmark folder 426 is not synchronized with local bookmark folder 438.

Logout request 448 may be sent from web client 428 to web server 412, signaling the end of the online session. Optionally, a synchronization of local client profile 432 may be again performed with client profile 414 to synchronize bookmarks and browsing history from the most recent online session.

Figure 5:
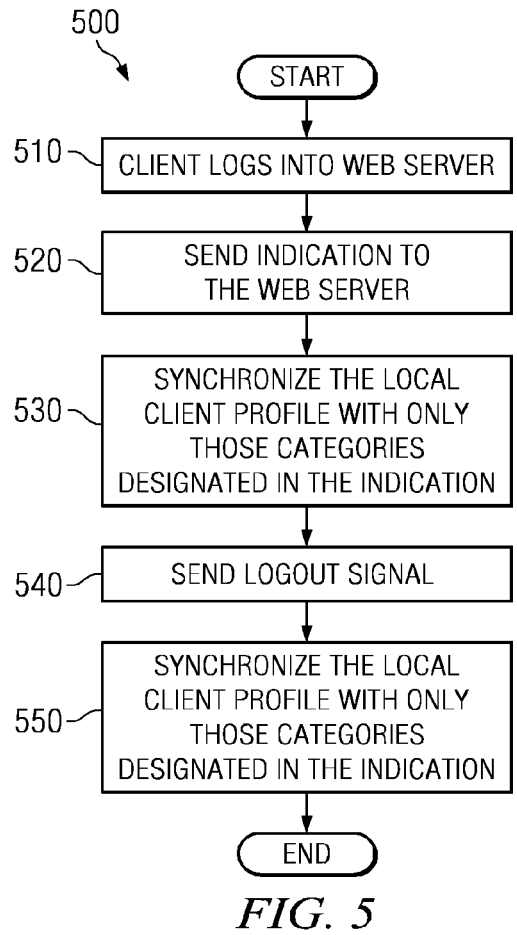
FIG. 5 is a process for synchronizing bookmarks and history between a client data processing system and a web server in which illustrative embodiments may be implemented.

Referring now to FIG. 5 a process for synchronizing bookmarks and history between a client data processing system and a web server is shown in which illustrative embodiments may be implemented. Process 500 is a software process executing on a client, such as client 110 of FIG. 1, and within a browser, such as browser 430 of FIG. 4. Process 500 may be implemented as a plug-in, which interfaces with, or is embedded into, a browser allowing a web client to update bookmarks locally, and then synchronize the local bookmarks with server bookmarks during a sign on or sign off period.

Once the local plug-in is installed, process 500 begins when a client, such as client 110 of FIG. 1, logs into the web server (step 510), such as web server 412 of FIG. 4. Login is accomplished when the client is authenticated. In an illustrative embodiment, login is accomplished when process 500 sends a login request, and the web server identifies that the client has a user profile stored in the web server. The login request can be login request 444 of FIG. 4, and can include a login name and login password of the client. In an alternative illustrative embodiment, login can be accomplished automatically, such as by identifying a "cookie" on the client data processing system.

Responsive to a web client logging into the web server, process 500 sends an indication to the web server (step 520). The indication identifies to the web process which of the various categories a user has designated to synchronize with local client profile.

Responsive to sending the indication, process 500 synchronizes the local client profile with only those categories designated in the indication (step 530). In one illustrative example, if the user has designated that both a first category and a second category should be synchronized with the local client profile, all local bookmarks and history folders are synchronized with all of the server bookmarks and history folders. The first category history folder is synchronized with the local history folder. Also, the second category history folder is synchronized with the local history folder. Similarly, the first category bookmark folder is synchronized with the local bookmark folder. Also, the second category bookmark folder is synchronized with local bookmark folder.

In a second illustrative example, if the user has designated that only a first category, and not a second category, should be synchronized with the local client profile, all local bookmarks and history folders are synchronized with only the server bookmarks and history folders of the first category. The first category history folder is synchronized with the local history folder. However, the second category history folder is not synchronized with the local history folder. Similarly, the first category bookmark folder is synchronized with the local bookmark folder. However, the second category bookmark folder is synchronized with local bookmark folder.

When the client is finished with the online session, process 500 sends a logout signal from the client (step 540). Responsive to sending a logout signal from the client to the web server, process 500 again synchronizes the local history and local bookmarks with those history and bookmark categories designated in the indication (step 550), with the process terminating thereafter.

Figure 6:
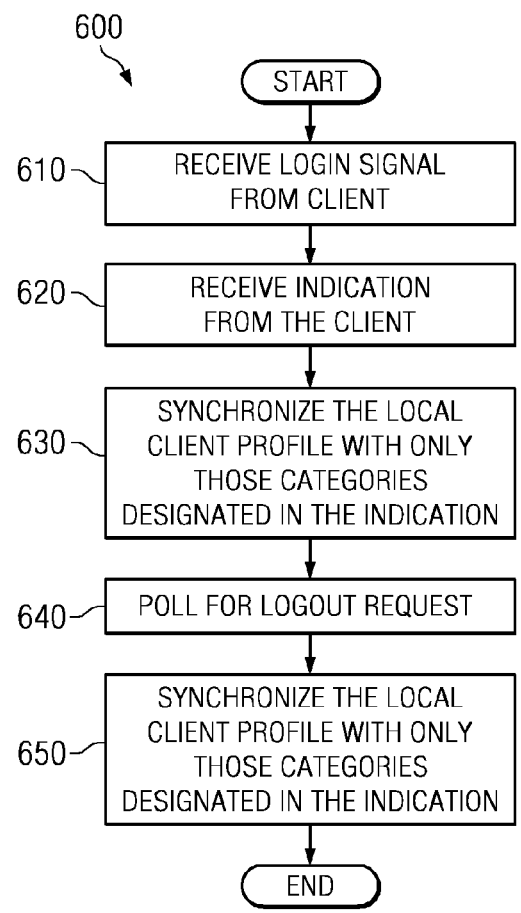
FIG. 6 is a process for synchronizing bookmarks and history from a web server to a client in which illustrative embodiments may be implemented.

Referring now to FIG. 6, a process for synchronizing bookmarks and history from a web server to a client is shown in which illustrative embodiments may be implemented. Process 600 is a software process executing on a software component of a web server, such as web server 412 of FIG. 4.

Process 600 begins by receiving a login signal from a client (step 610), such as client 110 of FIG. 1. Login is accomplished when the client is authenticated. In an illustrative embodiment, login is accomplished when process 600 receives a login request from a client, and identifies that the client has a user profile stored in the web server. The login request can be login request 444 of FIG. 4, and can include a login name and login password of the client. In an alternative illustrative embodiment, login can be accomplished automatically, such as by identifying a "cookie" on the client data processing system.

Responsive to a web client logging into the web server, process 600 receives an indication from the web client (step 620). The indication identifies to the web process which of the various categories a user has designated to synchronize with local client profile.

Responsive to receiving the indication, process 600 synchronizes the local client profile with only those categories designated in the indication (step 630). In one illustrative example, if the user has designated that both a first category and a second category should be synchronized with the local client profile, all local bookmarks and history folders are synchronized with all of the server bookmarks and history folders. The first category history folder is synchronized with the local history folder. Also, the second category history folder is synchronized with the local history folder. Similarly, the first category bookmark folder is synchronized with the local bookmark folder. Also, the second category bookmark folder is synchronized with local bookmark folder.

In a second illustrative example, if the user has designated that only a first category, and not a second category, should be synchronized with the local client profile, all local bookmarks and history folders are synchronized with only the server bookmarks and history folders of the first category. The first category history folder is synchronized with the local history folder. However, the second category history folder is not synchronized with the local history folder. Similarly, the first category bookmark folder is synchronized with the local bookmark folder. However, the second category bookmark folder is synchronized with the local bookmark folder.

Process 600 then polls for a logout request, such as logout request 448 of FIG. 4, from the client (step 640). Responsive to receiving a logout request from the client, process 600 again synchronizes the local client profile with only those categories designated in the indication (step 650), with the process terminating thereafter.

Thus, the illustrative embodiments describe a computer implemented method, apparatus, and computer program product for allowing a user to seamlessly store bookmarks and browser history to a web server for common use at the various systems from which they access online information. Initial setup of the software allows the user to choose what categories they want to store to the web server, including browser history and bookmarks. The initial setup also allows the user to link an online profile to the system they are logged into. The initial setup further allows the user to define and choose various categories of bookmarks and browsing history to display on the current system. Various categories, such as public history, public bookmarks, private history, and private bookmarks, could be implemented. User modifiable defaults, such as auto logging to access the information in the online user profile, may also be provided. A local copy of designated categories may be synchronized to the current system and stored locally for instances when the online service is unavailable.

The user is able to access bookmarks and history normally; except that bookmarks are transferred from the web server, instead of being stored exclusively local. Depending on how the user sets up the current system, certain pieces of data may not be available. Various systems can then be configured to show all of, or only some of these categories. For example, a user has two categories for bookmarks, a public and a private. When accessing the user profile from a publicly designated system, the user would only have the public links displayed in his list. The private category remains hidden when viewed from the public system, but would still be available to any system that the user chooses to setup to access private information.

The illustrative embodiments can be implemented into a browser when the web browser has no native support, such as through a web browser plug-in. The plug-in could be integrated into any future release of compatible web browsers. The plug-in could be configured when it is installed.

The illustrative embodiments also provide a new revenue model for the service providers of users choosing to utilize the illustrative embodiments. Because server space is often not free, it may be required that the users pay a fee to use an advertisement-supported server.

The illustrative embodiments could be widened to include other online profiles that may be useful to multiple system users. These may include, but are not limited to, the operating system configurations, productivity software settings, shortcut keys, and accessibility options.

The invention can take the form of an entirely hardware embodiment, an entirely software embodiment or an embodiment containing both hardware and software elements. In a preferred embodiment, the invention is implemented in software, which includes, but is not limited to, firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices can be coupled to the system either directly or through intervening I/O controllers. I/O devices can include but are not limited to keyboards, displays, and pointing devices.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for synchronizing information within a browser, the method comprising:
    storing server browser information on a web server comprising a data processor and a memory, wherein the server browser information comprises a first category and a second category;
    receiving an indication identifying a designated category from the first category and the second category;
    responsive to receiving the indication, displaying to the user only the designated category of the server browser information, wherein the indication indicates a category selection which a client has designated to synchronize with a local profile.

2. The computer implemented method of claim 1 further comprising:
    further responsive to receiving the indication identifying a designated category from the first category and the second category, synchronizing the server browser information with a local browser information, wherein only the designated category is synchronized with the local browser information.

3. The computer implemented method of claim 1 further comprising:
    responsive to receiving the indication identifying each of the first category and the second category as the designated category, displaying to the user both the first category of the browser information and the second category of the browser information.

4. The computer implemented method of claim 3 further comprising:
    further responsive to receiving the indication identifying each of the first category and the second category as the designated category, synchronizing the server browser information with a local browser information, wherein the local browser information is synchronized with both the first category, and the second category.

5. The computer implemented method of claim 2 further comprising:
    storing the server browser information on the web server, wherein the first category comprises a first category history and first category bookmarks, wherein the second category comprises a second category history and second category bookmarks, wherein the local browser information comprises a local history and local bookmarks.

6. The computer implemented method of claim 1 further comprising:
    receiving a login request from the user;
    identifying a user profile associated with the user, wherein the user profile is associated with the server browser information; and
    further responsive to receiving the indication identifying a designated category from the first category and the second category, synchronizing the server browser information with a local browser information, wherein only the designated category is synchronized with the local browser information.

7. The computer implemented method of claim 3 further comprising:
    receiving a login request from the user;
    identifying a user profile associated with the user, wherein the user profile is associated with the server browser information; and
    further responsive to receiving the indication, identifying each of the first category and the second category as the designated category, synchronizing the server browser information with a local browser information, wherein the local browser information is synchronized with both the first category and the second category.

8. A computer program product comprising:
    a non-transitory computer readable medium having computer usable program code for displaying information within a browser, the computer program product comprising: computer usable program code for storing server browser information on a web server, wherein the server browser information comprises a first category and a second category;
    computer usable program code for receiving an indication identifying a designated category from the first category and the second category; and
    computer usable program code, responsive to receiving the indication, for displaying to the user only the designated category of the server browser information, wherein the indication indicates a category selection which a client has designated to synchronize with a local profile.

9. The computer program product of claim 8 further comprising:
    computer usable program code, further responsive to receiving the indication identifying a designated category from the first category and the second category, for synchronizing the server browser information with a local browser information, wherein only the designated category is synchronized with the local browser information.

10. The computer program product of claim 8 further comprising:
    computer usable program code, responsive to receiving the indication identifying each of the first category and the second category as the designated category, for displaying to the user both the first category of the browser information and the second category of the browser information.

11. The computer program product of claim 10 further comprising:
    computer usable program code, further responsive to receiving the indication identifying each of the first category and the second category as the designated category, for synchronizing the server browser information with local browser information, wherein the local browser information is synchronized with both the first category and the second category.

12. The computer program product of claim 9 further comprising:
   computer usable program code for storing the server browser information on the web server, wherein the first category comprises a first category history and first category bookmarks, wherein the second category categories comprises a second category history and second category bookmarks, wherein the local browser information comprises a local history and local bookmarks.

13. The computer program product of claim 8 further comprising:
   computer usable program code for receiving a login request from the user;
   computer usable program code for identifying a user profile associated with the user, wherein the user profile is associated with the server browser information; and
   computer usable program code, further responsive to receiving the indication identifying a designated category from the first category and the second category, for synchronizing the server browser information with a local browser information, wherein only the designated category is synchronized with the local browser information.

14. The computer program product of claim 10 further comprising:
   computer usable program code for receiving a login request from the user;
   computer usable program code for identifying a user profile associated with the user, wherein the user profile is associated with the server browser information; and
   computer usable program code, further responsive to receiving the identifying indication, each of the first category and the second category as the designated category, for synchronizing the server browser information with a local browser information, wherein the local browser information is synchronized with both the first category, and the second category.

15. A data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to store server browser information on a web server, wherein the server browser information comprises a first category and a second category, to receive an indication identifying a designated category from the first category and the second category, and responsive to receiving the indication that the user is on a public system, display to the user only the designated category of the server browser information, wherein the indication indicates a category selection which a client has designated to synchronize with a local profile.

16. The data processing system of claim 15 wherein the processor unit further executes the computer usable program code, identifying a designated category from the first category and the second category, to synchronize the server browser information with a local browser information, wherein only the designated category is synchronized with the local browser information.

17. The data processing system of claim 15 wherein the processor unit further executes the computer usable program code, responsive to receiving the indication identifying each of the first category and the second category as the designated category, to display to the user both the first category of the browser information and the second category of the browser information.

18. The data processing system of claim 17 wherein the processor unit further executes the computer usable program code, further responsive to receiving the indication identifying each of the first category and the second category as the designated category, synchronize the server browser information with a local browser information, wherein the local browser information is synchronized with both the first category, and the second category.

19. The data processing system of claim 16 wherein the processor unit further executes the computer usable program code to store the server browser information on the web server, wherein the first category comprises a first category history and first category bookmarks, wherein the second category categories comprises a second category history and second category bookmarks, wherein the local browser information comprises a local history and local bookmarks.

20. The data processing system of claim 15 wherein the processor unit further executes the computer usable program code to receive a login request from the user, identify a user profile associated with the user, wherein the user profile is associated with the server browser information, and further responsive to receiving the indication identifying a designated category from the first category and the second category, to synchronize the server browser information with a local browser information, wherein only the designated category is synchronized with the local browser information.

* * * * *